United States Patent [19]

Biglione

[11] Patent Number: 4,937,280

[45] Date of Patent: Jun. 26, 1990

[54] BLENDS BASED ON VINYL-AROMATIC POLYMERS HAVING HIGH TENACITY AND IMPACT STRENGTH

[75] Inventor: Gianfranco Biglione, Mantova, Italy

[73] Assignee: Montedipe S.p.A., Milan, Italy

[21] Appl. No.: 303,954

[22] Filed: Jan. 31, 1989

Related U.S. Application Data

[63] Continuation of Ser. No. 188,074, Apr. 28, 1988, abandoned, which is a continuation of Ser. No. 889,527, Jul. 25, 1986, abandoned.

[30] Foreign Application Priority Data

Jul. 26, 1988 [IT] Italy ................................ 21753 A/85

[51] Int. Cl.$^5$ ............................................. C08L 51/04
[52] U.S. Cl. .................................... 524/504; 524/529; 525/63; 525/66; 525/67; 525/68; 525/71; 525/171; 525/175
[58] Field of Search .................... 525/71; 524/504, 529

[56] References Cited

U.S. PATENT DOCUMENTS 4,233,409  11/1980  Bulkley ................................ 525/71

Primary Examiner—Jacob Ziegler
Attorney, Agent, or Firm—Stevens, Davis, Miller & Mosher

[57] ABSTRACT

Blends based on vinyl-aromatic polymers having high tenacity and impact strength, comprising:
a vinyl-aromatic copolymer containing from 2 to 25% by weight of an ethylenically unsaturated nitrile and a rubber amount not higher than 15% by weight; and
a grafted polymer consisting of an elastomeric core having a transition temperature of the second order lower than 10° C. containing, in the grafted form, chains of vinyl monomers.

5 Claims, No Drawings

BLENDS BASED ON VINYL-AROMATIC POLYMERS HAVING HIGH TENACITY AND IMPACT STRENGTH

This application is a continuation of application Ser. No. 188,074, filed Apr. 28, 1988, which is a continuation of application Ser. No. 889,527, filed July 25, 1986, now both abandoned.

BACKGROUND OF THE INVENTION

1. Field of the Invention

The present invention relates to blends based on vinyl-aromatic polymers having high tenacity and impact strength.

More particularly, the present invention relates to blends of vinyl-aromatic polymers having high tenacity, suitable for producing shaped articles endowed with good impact strength properties.

2. The Prior Art

As known, the vinyl-aromatic polymers in question are prepared by polymerization, either in mass or mass-suspension, of solutions of polybutadiene rubbers or styrene-butadiene rubbers, or saturated rubbers of the ethylene-propylene type, in a styrene-acrylonitrile mixture. The resulting polymer is suited to the production of molded or extruded articles having a fairly good tenacity, which is sufficient for normal uses but insufficient for those applications, in which a high impact strength is required.

This is due to the fact that by said polymerization procedure (other than the polymerization in emulsion generally utilized for the production of the ABS resins) it is possible to employ only reduced amounts of rubber, owing to the too high viscosities of the polymerization mass.

A way to overcome this lack of properties is that of preparing blends with other polymers which possess the lacking properties, to obtain a material exhibiting the desired combination of properties. However, this approach was successful only in a few cases: generally, in fact, the blending results in the combination of the worst characteristics of each component, so that a material with so poor properties is obtained, that is it has no commercial or practical value.

The reasons for this drawback depend on the fact that not all the polymers are compatible with one another, and therefore they do not perfectly adhere. This gives rise to interfaces between the components of the mixture, such interfaces representing the weak and break points.

THE PRESENT INVENTION

The Applicant has now found that by mixing a vinyl-aromatic copolymer containing, in the copolymerized form, from 2 to 25% by weight of an ethylenically unsaturated nitrile and a rubber amount not exceeding 15% by weight, with a grafted polymer consisting of an elastomeric base having a transition temperature of the second order below 10° C. and containing, in the grafted form, chains of vinyl monomers, it is possible to obtain a material which exhibits a high tenacity and a high impact strength and in which the components are compatible with one another and perfectly adhere to one another.

Thus, object of the present invention are blends comprising:

(a) a vinyl-aromatic copolymer containing from 2 to 25% by weight of an ethylenically unsaturated nitrile and a rubber amount not higher than 15% by weight; and (b) a grafted polymer consisting of an elastomeric core having a second order transition temperature lower than 10° C. and containing, in the grafted form, vinyl monomers chains.

The proportions between the two components (a) and (b) can be varied over a wide range, although values from 10 to 98%, and preferably from 35 to 85% by weight of (a), and, correspondingly, from 90 to 2%, and preferably from 65 to 15% by weight, of (b) are generally employed.

The term "vinyl-aromatic copolymer", whenever used in the present description and in the claims, means any thermoplastic solid polymer and relevant copolymer composed for the most part, i.e. containing, chemically bound, at least 50% by weight, of one or more vinyl aromatic compounds having general formula:

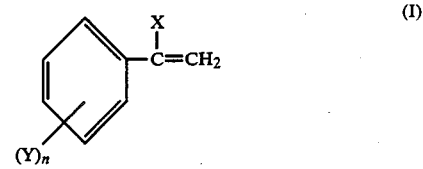

in which X is hydrogen or an alkyl radical having 1 to 4 carbon atoms; n is zero or an integer from 1 to 5 and Y is a halogen or an alkyl radical having 1 to 4 carbon atoms.

Examples of vinyl-aromatic compounds having the above general formula are: styrene; methyl-styrene; mono-, di-, tri-, tetra and penta-chloro-styrene and the corresponding alpha-methyl-styrenes, nucleus-alkylated styrenes and the corresponding alpha-methyl-styrenes such as ortho- and para-methyl-styrenes, ortho- and para-ethyl-styrenes, ortho- and para-methyl-alpha-methyl-styrenes, etc. These monomers are utilizable either alone or in admixture with one another or with other copolymerizable comonomers such as for example maleic anhydride.

The rubbers are employed to render the vinyl-aromatic polymers impact resistant and, according to the present invention, the rubber content shall not exceed 15% by weight. Amounts from 2 to 12% by weight are preferred.

The rubbers utilized to this purpose are: polybutadiene, polyisoprene, the butadiene and/or isoprene copolymers with styrene or with other monomers, or the saturated rubbers of the ethylene-propylene type, the ethylene-propylene-diene terpolymers, silicone rubbers with unsaturated groups, and the like.

Ethylenically unsaturated nitrile, copolymerized with the vinyl-aromatic monomer, means, first of all and preferably, acrylonitrile; other ethylenically unsaturated nitrile monomers such as methacrylonitrile can be advantageously utilized.

The modified vinyl-aromatic copolymers can be prepared according to any conventional polymerization process, either in suspension, or mass-suspension or continuous mass, provided the above-mentioned compounds are utilized as starting monomers.

Said modified vinyl-aromatic copolymers differ from the known acrylonitrile-butadiene-styrene resins, which are known as ABS resins, as regards morphology, structure and size of the rubber particles dispersed in the rigid polymeric matrix. As a consequence of such morphological differences, the blends of the present invention exhibit a resilience or impact strength exceeding that of the ABS resin, particularly when the rubber content is lower than 15% and preferably lower than 10% by weight.

The grafted polymer utilized to increase the impact strength of the vinyl-aromatic copolymer consists of an elastomeric core containing, in the grafted form, chains of vinyl monomers.

The elastomeric core having a second order transition temperature lower than 10° C. can be polybutadiene, copolymers of butadiene with styrene and/or with acrylonitrile, in which the content of butadiene is higher than 50% by moles, ethylene-propylene rubbers, ethylene-propylene-diene rubbers (EPDM), or acrylic rubbers. The acrylic rubber can be an elastomer, obtained through polymerization of a monomeric system comprising: 90 to 99.8% by weight of an alkyl-acrylate, containing from 1 to 6 carbon atoms in the alkyl chain; 0.1 to 5% by weight of a cross-linking monomer and 0.1 to 5% by weight of a grafting agent. In the acrylic rubber, the cross-linking agent can be a polyacrylic or polymethacrylic ester of polyols such as butylene-diacrylate or dimethacrylate, trimethylol-propane-trimethacrylate etc.; among these monomers, butylene-diacrylate is the preferred one. In the acrylic rubber the grafting agent can be a polyethylenically unsaturated monomer having a plurality of reactive groups, which are polymerizable by addition, such as those containing the allyl group. Examples of suitable grafting monomers can be the allyl esters of ethylenically unsaturated acids, such as allyl acrylate, allyl methacrylate, diallyl maleate, diallyl fumarate, diallyl itaconate etc. The function of the grafting monomer is that of providing a residual content of unsaturation in the elastomeric step, particularly in the last polymerization steps and, by consequence, at, or in proximity of, the surfaces of the elastomer particles.

The grafted vinyl monomers of the elastomeric core can be derivatives of acrylic acid and of methacrylic acid, vinyl-aromatic compounds, vinyl-cyanide compounds and polyfunctional derivatives, either alone or in admixture with one another. Specific examples of these grafted vinyl monomers comprise alkyl esters of methacrylic acid, in which the alkyl radical contains from 1 to 16 carbon atoms, preferably methylmethacrylate, esters of methacrylic acid with polyfunctional alcohols such as 1, 3-butylene-glycol dimethacrylate and trimethylol-propane-trimethacrylate, allyl methacrylate and/or diallyl methacrylate; vinyl-aromatic compounds such as styrene, vinyltoluene, alpha-methyl-styrene, halogenated styrene, vinyl-naphthene or divinylbenzene, styrene being particularly preferred; compounds of vinyl-cyanide such as acrylonitrile, methacrylonitrile, alpha-halogenated acrylonitriles, acrylonitrile being particularly preferred.

These vinyl monomers can be used either alone or in admixture.

The grafted copolymer utilized in the blends which are the object of the present invention has preferably an elastomer content higher than 35% and up to 95% by weight.

These copolymers can be prepared by any known method such as bulk polymerization, polymerization in suspension, bulk-suspension polymerization, polymerization in solution or polymerization in emulsion. In the preparation of the grafted copolymer, a homo- or copolymer of the vinyl monomer can be directly formed in the reaction product, or the reaction product as such can be used as a grafted polymer.

Preferably, one or more vinyl monomers are grafted to the elastomeric core.

A typical example of grafted polymer to be used in the present blend may be a three-step polymer having a rubber-like core based on butadiene, a second step polymerized by styrene and a final step, or shell, polymerized by methyl-methacrylate and 1,3-butylene-glycoldimethacrylate.

Another example of grafted polymer to be used in the present blend can be a two-step polymer: the first step, consisting for 60–95% by weight of the polymer, obtained starting from a monomeric system comprising 95–99.8% by weight of butyl acrylate, 0.1–2.5% by weight of butylene-diacrylate and 0.1–2.5% of allyl methacrylate or diallyl maleate, and the final step obtained from a polymerized compound containing from 60 to 100% by weight of methylmethacrylate.

The grafted polymers cited hereinbefore are well known commercial products and are available from a great number of manufactures such as, for example, Rohm and Haas Company, Philadelphia, USA, under the trade-name Acryloid KM 653 and KM 323, or from Kanegafuchi, under the trade-name KaneACE B 28, etc.

To the blends object of the present invention it is possible to add other polymers compatible therewith, such as polycarbonate, polyesters, thermoplastic polyurethanes, polymethacrylates, styrene-methylmethacrylate copolymers, acrylic polymers, ABS, styrene-maleic anhydride copolymers, SAN and other engineering polymers, vinyl chloride polymers, etc. Such engineering polymers or polymers can be added in any ratio, such as for example from 1 to 90% by weight referred to the blend.

Furthermore, the blends of the present invention can be co-extruded with said polymers or engineering polymers to provide composites having specific characteristics for the individual applications.

The blends forming the object of this invention are preparable by hot mixing, in any known mixing unit, such as single-screw and two-screw extruders, Banbury mixers, mixing rollers and the like, at temperatures ranging from 180° to 260° C.

The compositions may contain stabilizers or other intimately incorporated additives, such as plasticizers, lubricants, antiflame agents, antistatic agents, dyestuffs, pigments, glass fibres or other inorganic fillers etc., in order to impart particular characteristics to the material.

The blends, object of the present invention, are easy to be processed and exhibit a complex of properties which make them suited to be utilized for preparing articles having a high tenacity along with a high impact strength. Said mixes are therefore used in the field of the household electrical apparatus, in the field of electronics and technical articles in general, in the form of films, sheets, strips, tapes, rods, boxes, cups, containers and the like. The blends are utilizable for producing foamed articles, using the conventional techniques of the art.

For a better understanding of the present invention and to facilitate the embodiment thereof, a few illustrative but not limitative examples are given hereinafter.

In the examples, unless otherwise specified, all parts and percentage are by weight.

EXAMPLES 1-3

By means of a single-screw extruder Bandera TR 45, with a length/diameter ratio of 25, there were extruded, under degassing and at a temperature of 210° C., blends consisting of:

(a) a vinyl-aromatic copolymer consisting of 72% by weight of styrene, of 12% by weight of alpha-methyl-styrene and of 8% by weight of butadiene rubber and of 8% by weight of acrylonitrile, and (b) a grafted polymer of the type indicated in Table 1.

The weight ratios between the two components of the mix are reported in Table 1.

By cutting the strands leaving the extruder, granules were obtained, which were dried for 2-4 hours at 80°-90° C.

To determine the characteristics, the granules were injection molded at a temperature of 210° C. in a press NEGRI & BOSSI V-17-110 FA to obtain samples having dimensions in compliance with the standards.

The properties measured on the samples so obtained are reported in the following Table 1.

For measuring the characteristics of the blends, object of the present invention, the following methods were employed:

A. Mechanical Properties

There were measured the tensile strengths and elastic modulus, according to ASTM D 638, and IZOD resilience with notch at 23° C., according to ASTM D 256, on 3.2 mm thick samples.

B. Thermal Properties

Softening temperature VICAT B (5 kg in oil) was determined according to standard ISO 306.

C. Rheological Properties

The melt index was determined according to standard ASTM D 1238 at 220° C. and 10 kg.

TABLE I

| COMPOSITION | | UNIT | EXAMPLES 1 | 2 | 3 |
|---|---|---|---|---|---|
| (a) Vinyl-aromatic copolymer | | | 100 | 85 | 85 |
| (b) Grafted polymer | A | | | 15 | — |
| | B | | | — | 15 |
| A. Mechanical properties | | | | | |
| Tensile strength | | | | | |
| yield strength | | MPa | 30 | 27 | 28,5 |
| tensile stress | | MPa | 31 | 29 | 29,5 |
| elongation at break | | % | 45 | 64 | 69 |
| elastic modulus | | MPa | 1800 | 1550 | 1450 |
| Resilience IZOD | | | | | |
| ½" × ⅛" | | J/m | 90 | 120 | 110 |
| ½" × ¼" | | J/m | 80 | 110 | 105 |
| B. Thermal properties | | | | | |
| Vicat B | | °C. | 98 | 93 | 93 |
| C. Rheological properties | | | | | |
| Melt index | | g/10' | 12 | 5,5 | 5¹ |

A = ACRYLOID KM 323 B
B = ACRYLOID KM 653

EXAMPLES 4-8

By operating under the same conditions as in examples 1 to 3, granules were prepared starting from blends composed by:

(a) a vinyl-aromatic copolymer consisting of 72% by weight of styrene, of 20% by weight of acrylonitrile and of 8% by weight of polybutadiene rubber;

(b) a grafted polymer of the type reported in Table II, and optionally (c) an aromatic polycarbonate type "SINVET" sold by ANIC, San Donato Milanese - MILANO.

The weight ratios of the blends are reported in Table II as well as the properties measured on the samples obtained from said blends.

TABLE II

| COMPOSITION | | UNIT | EXAMPLES 4 | 5 | 6 | 7 | 8 |
|---|---|---|---|---|---|---|---|
| (a) Vinyl-aromatic copolymer | | | 85 | 85 | 85 | 70 | 50 |
| (b) Grafted polymer | A | | 15 | — | — | — | — |
| | B | | — | 15 | — | 30 | 7,5 |
| | C | | — | — | 15 | — | — |
| (c) Aromatic polycarbonate | | | — | — | — | — | 42,5 |
| A. Mechanical properties | | | | | | | |
| Tensile strength | | | | | | | |
| yield strength | | MPa | 32 | 27 | 27,5 | 25 | 41 |
| tensile stress | | MPa | 29 | 29 | 26,5 | 27 | 44 |
| elongation at break | | % | 29 | 61 | 52 | 75 | 102 |
| elastic modulus | | MPa | 1950 | 1600 | 1700 | 1450 | 2000 |
| Resilience IZOD | | | | | | | |
| ½" × ⅛" | | J/m | 190 | 160 | 115 | 210 | 450 |
| ½" × ¼" | | J/m | 145 | 135 | 100 | 185 | 250 |
| B. Thermal properties | | | | | | | |
| Vicat B | | °C. | 92 | 93 | 93 | 88 | 112 |
| C. Rheological properties | | | | | | | |
| Melt index | | g/10' | 5,5 | 5 | 8,5 | 3,5 | 8,0 |

A = ACRYLOID KM 323B
B = ACRYLOID KM 653
C = Kane ACE B 28

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. Blends based on vinyl-aromatic polymers having a high tenacity and impact strength, comprising:

(a) from 10 to 98% by weight of a vinyl-aromatic copolymer containing from 2 to 25% by weight of an ethylenically unsaturated nitrile and a rubber in an amount not exceeding 15% by weight, and (b) a core-shell polymer consisting of an elastomeric core having a second order transition temperature lower than 10° C. and a shell consisting of vinyl monomers grafted to the elastomeric core, selected from derivatives of acrylic acid, derivatives of methacrylic acid, vinyl-aromatic compounds, vinyl-cyanide compounds, polyfunctional derivatives and mixtures thereof, the content of the elastomer being higher than 35% and up to 95% by weight, the blends of the vinyl-aromatic polymers having a high tenacity and impact, strength and a melt index from about 3.5 to about 8.5 g/10'.

2. The blends according to claim 1, wherein the core-shell polymer is a three-step polymer having a rubber core based on butadiene, a second step polymerized from styrene and a final step, or shell, polymerized from methyl-methacrylate and 1,3-butylene-glycol-dimethacrylate.

3. The blends according to claim 1, wherein the core-shell polymer is a two-step polymer: the first step, consisting of 60 to 95% by weight of the polymer, obtained starting from a monomeric system comprising 95–99.8% by weight of butyl acrylate, 0.1–2.5% by weight of butylene-diacrylate, and 0.1–2.5% of allyl methacrylate or diallyl maleate, and the final step obtained from a polymerized compound containing from 60 to 100% by weight of methyl-methacrylate.

4. The blends according to claim 1, comprising stabilizers, plasticizers, lubricants, antiflame agents, antistatic agents, glass fibres or other inorganic fillers.

5. Blends according to claim 1, wherein the blends have a melt index of about 5 g/10'.

* * * * *